United States Patent
Nomura

(10) Patent No.: US 7,835,855 B2
(45) Date of Patent: Nov. 16, 2010

(54) WEATHER INFORMATION NOTIFICATION APPARATUS AND PROGRAM FOR SAME

(75) Inventor: Daisuke Nomura, Chiryu (JP)

(73) Assignee: DENSO CORPORATION, Kariya (JP)

( * ) Notice: Subject to any disclaimer, the term of this patent is extended or adjusted under 35 U.S.C. 154(b) by 422 days.

(21) Appl. No.: 11/987,035

(22) Filed: Nov. 27, 2007

(65) Prior Publication Data
US 2008/0133125 A1    Jun. 5, 2008

(30) Foreign Application Priority Data
Nov. 30, 2006  (JP)  .............................. 2006-324158
Nov. 2, 2007   (JP)  .............................. 2007-286355

(51) Int. Cl.
    *G01C 21/00*   (2006.01)
(52) U.S. Cl. .................. 701/201; 701/10; 701/204; 701/211; 340/995.27
(58) Field of Classification Search ............... 701/10, 701/36, 201, 204, 207, 211; 340/988, 426.19, 340/995.17, 995.27
See application file for complete search history.

(56) References Cited

U.S. PATENT DOCUMENTS

| 2002/0067289 | A1 | 6/2002 | Smith |
| 2002/0094825 | A1* | 7/2002 | Endo et al. .................. 455/456 |
| 2007/0159355 | A1* | 7/2007 | Kelly et al. .................. 340/905 |

FOREIGN PATENT DOCUMENTS

| JP | A-8-101040 | 4/1996 |
| JP | A-10-307042 | 11/1998 |
| JP | A-11-120490 | 4/1999 |
| JP | A-2001-23084 | 1/2001 |
| JP | A-2006-84250 | 3/2006 |
| JP | A-2007-51974 | 3/2007 |

OTHER PUBLICATIONS

Office Action dated Dec. 26, 2008 in corresponding Chinese patent application No. 2007101940654 (and English translation).

* cited by examiner

*Primary Examiner*—Gertrude Arthur Jeanglaud
(74) *Attorney, Agent, or Firm*—Posz Law Group, PLC

(57) ABSTRACT

A navigation apparatus acquires weather information along a navigation route to a destination from an information center and calculates an importance that is assigned to the weather information based on a predetermined criterion as well as a determination mode and a travel purpose inputted from a user. The importance of the weather information may be calculated by employing an importance calculation table that defines importance of the weather information itself or the importance of the weather information relative to the navigation route. The importance of the weather information is used to extract a required part of the weather information for providing the user with the information. The weather information extraction may be performed according to a criterion such as extracting the weather information with a certain importance level or higher, extracting the weather information of top n th importance, or the like.

16 Claims, 7 Drawing Sheets

FIG. 4A

| WEATHER INFO. | FINE | CLOUDY | RAIN | HEAVY RAIN | TYPHOON | SNOW | ... |
|---|---|---|---|---|---|---|---|
| IMPORTANCE 0(S)→1(L) | 0.1 | 0.1 | 0.6 | 0.8 | 1 | 0.9 | ... |

FIG. 4B

| RELIABILITY (%) | 0~5 | ~10 | ~20 | ~30 | ... | ~90 | 90~100 |
|---|---|---|---|---|---|---|---|
| IMPORTANCE 0(S)→1(L) | 0 | 0.1 | 0.2 | 0.3 | ... | 0.9 | 1 |

FIG. 4C

| RELIABILITY (%) | 0 | ... | 25 | ... | 75 | ... | 100 |
|---|---|---|---|---|---|---|---|
| IMPORTANCE 0(S)→1(L) | 0 | INTER-POLATION | 0.1 | INTER-POLATION | 0.9 | INTER-POLATION | 1 |

FIG. 6A

| RATIO OF DISTANCE | 0~1/100 | ~1/75 | ~1/50 | ~1/25 | ~1/10 | ~1/5 | 1/5~ |
|---|---|---|---|---|---|---|---|
| IMPORTANCE 0(S)→1(L) | 0 | 0.2 | 0.4 | 0.6 | 0.8 | 0.9 | 1 |

FIG. 6B

| RATIO OF TIME | 0~1/100 | ~1/75 | ~1/50 | ~1/25 | ~1/10 | ~1/5 | 1/5~ |
|---|---|---|---|---|---|---|---|
| IMPORTANCE 0(S)→1(L) | 0 | 0.2 | 0.4 | 0.6 | 0.8 | 0.9 | 1 |

FIG. 6C

| SPEED LIMIT (km/h) | 0~20 | ~40 | ~60 | ~80 | ~100 | 100~ |
|---|---|---|---|---|---|---|
| IMPORTANCE 0(S)→1(L) | 0.1 | 0.4 | 0.6 | 0.9 | 1 | 1 |

FIG. 6D

| TIME | 0:00~5:00 | ~6:00 | ~7:00 | ~8:30 | ~9:00 | ~10:00 | ... |
|---|---|---|---|---|---|---|---|
| IMPORTANCE 0(S)→1(L) | 0.2 | 0.5 | 0.8 | 1 | 0.7 | 0.2 | ... |

WEATHER INFORMATION NOTIFICATION APPARATUS AND PROGRAM FOR SAME

CROSS REFERENCE TO RELATED APPLICATION

This application is based on and claims the benefit of priority of Japanese Patent Application No. 2006-324158 filed on Nov. 30, 2006, and No. 2007-286355 filed on Nov. 2, 2007, the disclosure of which is incorporated herein by reference.

FIELD OF THE DISCLOSURE

The present disclosure generally relates to a weather information reporting apparatus for reporting weather information along a travel route.

BACKGROUND INFORMATION

In recent years, various techniques for reporting weather information along a travel route that is set by a user are disclosed. For example, Japanese patent document JP-A-H11-120490 discloses a weather information reporting apparatus for reporting weather information along the travel route specified by a user based on transmitted data (area data, weather data) from a service center and a current position accompanied by a travel direction detected by a detector on a subject vehicle. The apparatus displays on a display unit weather icons representative of the weather of the area where the current position belongs to and certain numbers of areas where the travel route from the current position towards the destination belongs to.

The weather reporting apparatus simply displays the weather of the areas along the travel route, thereby displaying the weather of all of ten areas, for example, when there are ten areas along the travel route.

However, the user does not always have the same degree of interest to all of those ten pieces of weather information. When plural pieces of the weather information of respectively different relevance are displayed without application of any display selection criterion, the user feels it inconvenient due to a selection of the weather information according to his/her own interest.

SUMMARY OF THE DISCLOSURE

In view of the above and other problems, the present disclosure provides an apparatus and a program that notifies a user of only highly relevant weather information along a navigation route for better serving user's convenience.

A weather information notification apparatus of the present disclosure acquires weather information of an area that includes a route determined by route information for every relevant area when the relevant area is plural in number. A control unit in the apparatus provides a following control in the course of notifying the user of the acquired weather information. That is, the control unit first determines importance of the weather information itself or importance of the weather information relative to the route based on a result from employing a predetermined relationship or a predetermined equation, and then the control unit selects the weather information that meets a certain criterion based on the determined importance for notification to the user from a notification unit in a manner that allows the user to associate the weather information with a relevant area.

Therefore, selection of the weather information based on the importance of the weather information itself or the importance of the weather information in association with the route is considered to yield the weather information that is highly relevant for the user. Thus, the user's operation conventionally required for selecting the weather information according to his/her own interest is saved or decreased, thereby providing higher convenience for the user.

Further, the control unit as well as other units of the navigation apparatus described above may be implemented as a program for controlling the computer. The program may be stored in a storage medium such a DVD-ROM, a CD-ROM or the like for retrieval and execution by the computer.

BRIEF DESCRIPTION OF THE DRAWINGS

Other objects, features and advantages of the present invention will become more apparent from the following detailed description made with reference to the accompanying drawings, in which:

FIGS. 4A, 4B and 4C show diagrams of weather information importance factor tables;

FIGS. 6A to 6D show diagrams of weather information importance calculation tables.

DETAILED DESCRIPTION

One embodiment of the present invention is explained based on a drawing in the following.

Figure 1:
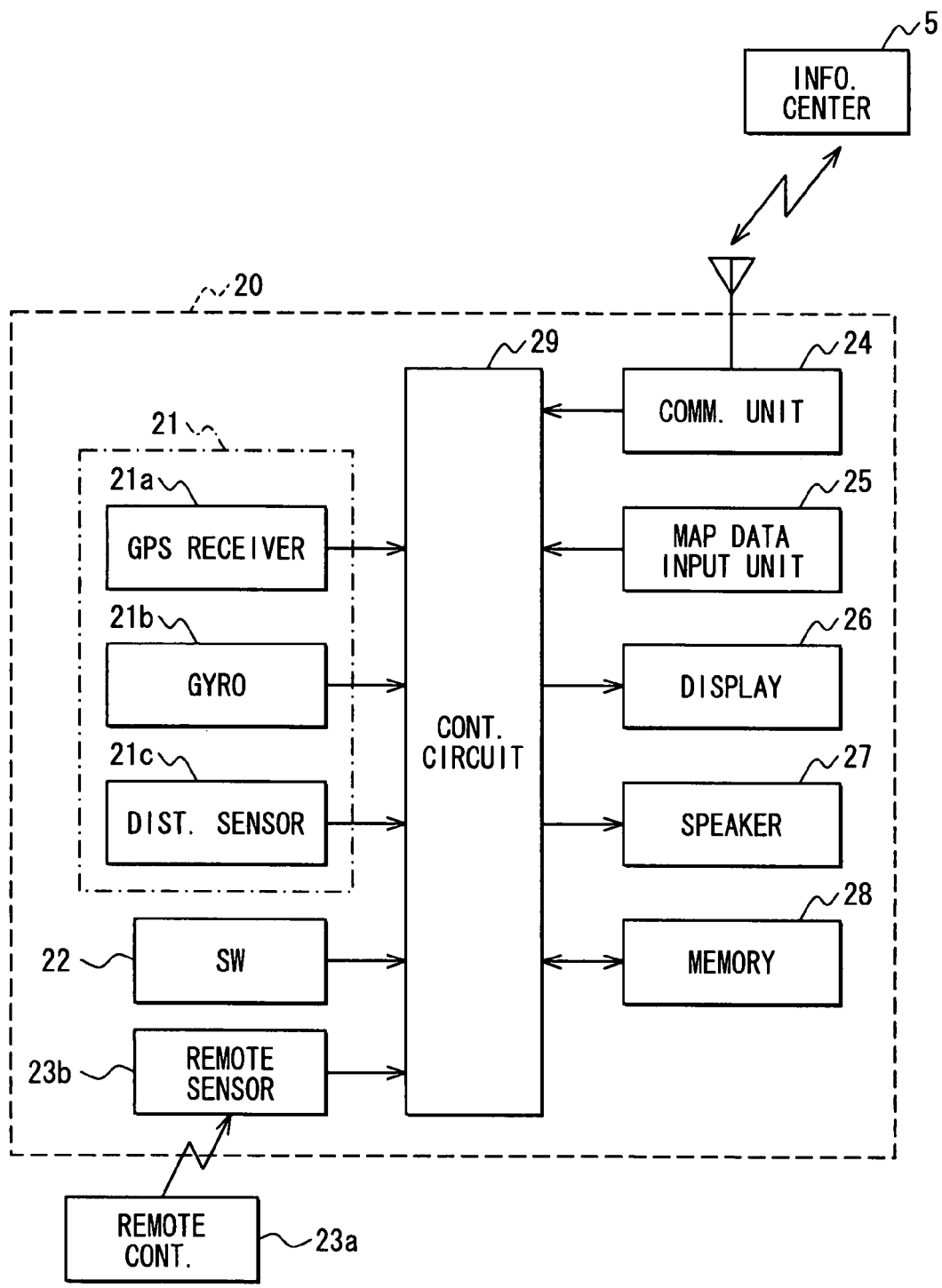
FIG. 1 shows a block diagram of a navigation apparatus in an embodiment of the present disclosure.

FIG. 1 is a block diagram showing outline configuration of a navigation apparatus 20 in which the function of the weather information notification device of the present invention is incorporated.

The navigation apparatus 20 is installed in a vehicle, and is connected to a position sensor 21 to detect a position, a progress direction, a speed of the vehicle and the like, an operation switch group 22 to input various user instructions, a wireless remote controller 23a to input user instructions in the same manner as the switch group 22, a wireless remote controller sensor 23b to input a signal from the remote controller 23a, a communication unit 24 remotely communicating with an information center 5, a map data input unit 25 to input map data and the like from an external memory medium or the like, a display unit 26 to display various objects such as map display screens and the like, a voice-output device (i.e., a speaker) 27 to output various guide sounds and the like, an external memory 28 in connection to a control unit 29 for memorizing various information, and the control unit 29 for controlling various components.

The position sensor 21 includes a GPS receiver 21a that receives the transmission of a message electric wave from a GPS (Global Positioning System) satellite through a GPS antenna for detecting the position of the vehicle, a speed, and a progress direction, and also includes a gyroscope 21b to detect a rotation of the vehicle and a distance sensor 21c to detect the distance. Because each of these sensors 21a-21c has the error of respectively different nature, these sensors 21a-21c are configured to supplement with each other. Further, depending on the accuracy, the position sensor 21 may be constituted of some of the sensors stated above, or a steering rotation sensor or a wheel sensor on each of the tires may be employed.

The operation switch group 22 may be mechanical switches on the display unit 26, touch switches integrally disposed on a display screen of the display unit 26 or the like. The touch panel is laminated on the display unit 26, and uses various methods such as a pressure sensing method, an electromagnetic induction method, a capacitance method or a combination of those methods.

The communication unit 24 receives the weather information which is delivered from an information center 5 through FM multiplex broadcasting, an electric wave or a light beacon by performing information communication with the information center 5. The communication unit 24 may be configured to receive the weather information from the information center 5 through the telephone network such as the Internet.

The map data input unit 25 is a device to input memorized various data from a map data memory medium (for example, a hard disk or DVD-ROM) which is not illustrated. On the map data memory medium, map data (node data, link data, cost data, background data, road data, name data, mark data, crossing data, facility data and the like) as well as audio data for guidance, sound recognition data and the like are memorized. Instead of inputting these data from the map data memory medium, these data may be input through a communication network. The name data, crossing data, facility data and the like are conceptually equivalent to "route information" in claim language.

The display unit 26 is a color display device, and may use a device such as a liquid crystal display, a plasma display, or a cathode ray tube (CRT). On a display screen of the display unit 26, the data such as a position mark to show the present vehicle location identified by the data from the map data input unit 25 and a detection result from the position sensor 21 as well as a navigation route to the destination, a location name, a landmark, icons of various facilities are displayed in a superposing manner. In addition, as described later, the navigation route is displayed in association with weather icons, (refer to FIG. 3A), or in association with the location names (refer to FIG. 3B). Further, the speaker 27 can output sounds of various guidance such as travel guidance and the like.

The control unit 29 consists mainly of a well-known type microcomputer that has a bus line to connect a CPU, ROM, RAM, I/O and the like, and performs various operations according to inputs from the position sensor 21, the operation switch group 22, the remote controller sensor 23b, the communication unit 24, and the map data input unit 25 stated above, beside controlling the communication unit 24, the display unit 26, and the speaker 27. The control unit 29 carries out various processing with data in the external memory 28 according to a program memorized by the ROM as required.

For example, a map display process or a route guidance process are considered as navigation-related processing. As for the map display process, the current position of the vehicle is calculated as a combination of coordinates and a progress direction based on each of detection signals from the position sensor 21, and the map display process displays on the display unit 26 a map of a neighborhood of the current position or the like that is retrieved from the map data input unit 25. In addition, as for the route guidance process, an optimum route from the current position to the destination is calculated based on the position data in the input unit 25 and the destination specified by the operations of the operation switch group 22 or the remote controller 23a, and guidance is provided for the travel along the calculated optimum route. For automatically setting the most suitable route, a cost calculation technique such as Dijkstra method or the like is employed.

In addition, the control unit 29 performs, in parallel with the above-mentioned processes of map display processing or route guidance process, provision of weather information. The details of the weather information provision process is described later. As stated above, the navigation apparatus 20 acquires the weather information from the information center 5 by the communication unit 24. How the information center 5 serves the weather information is explained in the following.

The information center 5 is connected to a radio base station which can communicate with each vehicle through a telecommunication channel, and wireless communication is provided to the navigation apparatus 20 through the radio base station for the information center 5 to transmit the weather information to the navigation apparatus 20. More practically, the information center 5 possesses a weather information database for storing weather information to be transmitted to the navigation apparatus 20, a channel terminal (not illustrated) for communication through a telecommunication channel, servers (not illustrated) for managing data and the like.

The weather information database accumulates a wide coverage of weather information based on information retrieved from various weather information sources as required. The accumulated information includes precipitation information such as a typhoon, a rain, a fog, a drizzle, a sleet, a snow, a hail and the like as well as cloud information that leads to the precipitation, wind information including wind intensity, wind direction and the like, atmospheric pressure information and the like.

The operation of the navigation apparatus 20 in the present embodiment for displaying the weather information along a set navigation route on the display unit 26 is explained as follows.

Figure 2:
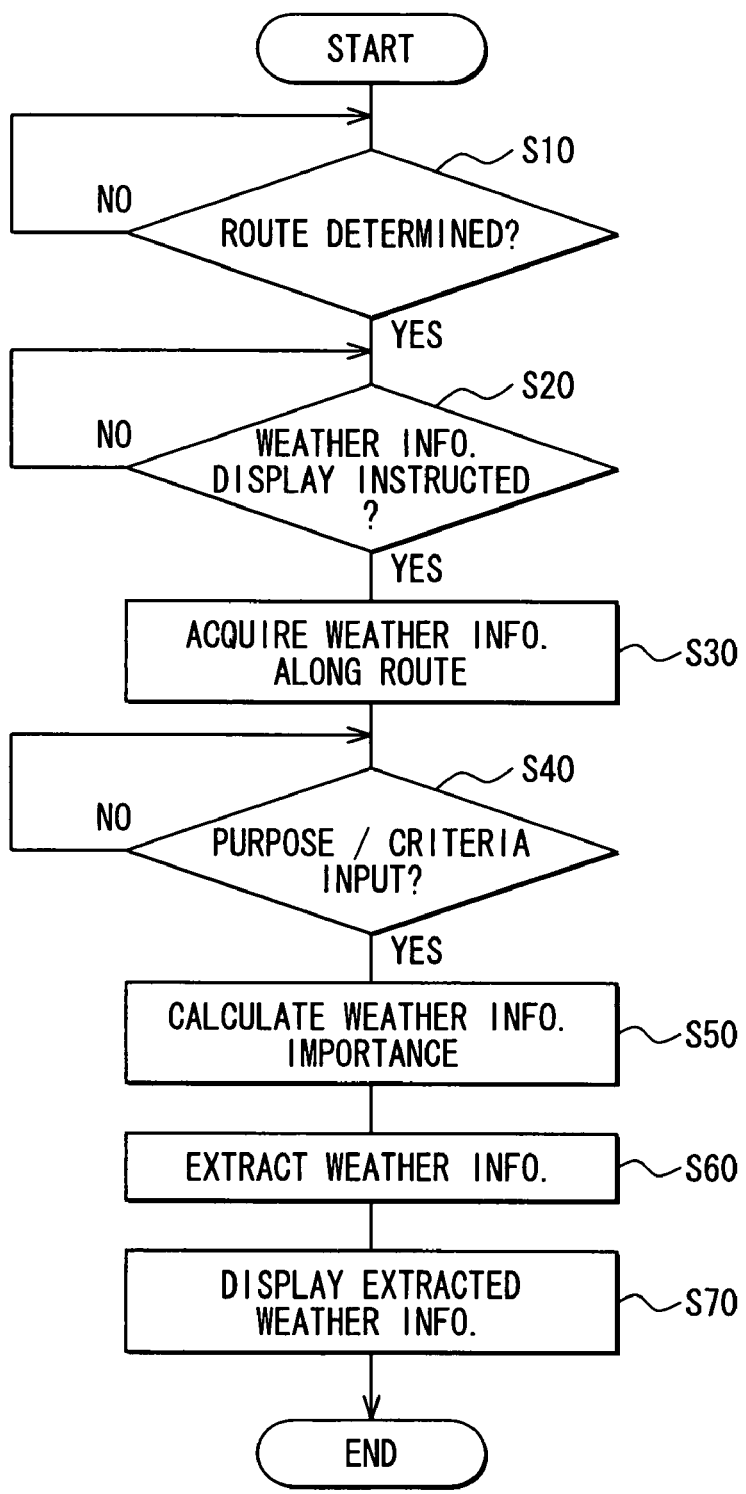
FIG. 2 shows a flowchart of a process of weather information display process performed by a control circuit of the navigation apparatus.

FIG. 2 is a flowchart showing the procedure of the weather information display process that the control unit 29 of the navigation apparatus 20 carries out.

First, whether a route setting has been finished is determined in step S10 (a step is represented by a sign S in the following). When the navigation route to the destination is set in a routing setting process that is carried out separately, a predetermined flag is put up. In S10, whether the flag is put up is determined.

When a route is not set (S10:NO), step S10 repeats itself to wait until a route is set. When the route is already set (S10:YES), the process proceeds to S20.

Then, whether an instruction to start a display process of the weather information is input through the operation switch group 22 or the wireless remote controller 23a by a user is determined in S20. If there is the instruction (S20:YES), the process proceeds to S30. The process repeats itself when the instruction has not been input in S20 (S20:NO).

In S30, each of the local weather information along the route that is already set is acquired. Though the technique to acquire each of the local weather information may take various forms, following three examples are explained in this case.

(1) For example, the weather information in the external memory 28 may be updated whenever the weather information is updated and received through broadcasting such as the FM multiplex broadcasting or the like. Then, the weather information of the areas along the route may be acquired in the process of S30 from the weather information memorized in the external memory 28.

(2) Further, for example, communication to the information center 5 through the communication unit 24 is performed for requesting the transmission of the weather information accumulated in the information center 5, and the weather information that has been transmitted from the information center 5 in response to the request is memorized in the external memory 28. Then, the weather information of the areas along the route may be acquired in the process of S30 from the weather information memorized in the external memory 28.

The information center 5 transmits, to the navigation apparatus 20, the weather information accumulated in the weather information database at the time of the request in response to the request from the navigation apparatus 20.

(3) In the example of the above (1) and (2), it is the navigation apparatus 20 that extracts the weather information of the areas that the navigation route passes through. However, the extraction of the weather information may be performed in the information center 5. In that case, through the communication to the information center 5 by the communication unit 24, information on the set navigation route is transmitted together with the request for transmission of the weather information along the navigation route. Then, the transmitted information is received by the navigation apparatus 20.

The information center 5 transmits the weather information to the navigation apparatus 20 after extracting the local weather information along the route from the weather information accumulated in the weather information database at the time of the request. The route is identified based on the information that is transmitted from the navigation apparatus 20 to the information center 5.

When each of the local weather information along the navigation route is acquired in S30, the process proceeds to S40. Then, whether there is the input of a travel purpose/a criterion mode is determined in S40. For example, as for the travel purpose, the travel itself may be the purpose of the travel, or viewing scenery may be the purpose of the travel. In addition, as for the criterion mode, a criterion mode for a novice driver, a criterion mode for an average driver or the like may be thought about. These criterion mode options may be displayed on, for example, the display unit 26, and the user input for choosing one of the mode options may be accepted through the operation switch group 22 or the remote controller 23a.

When there is the input of the travel purpose/the criterion mode (S40:YES), importance of weather forecast of each area is calculated according to the criterion based on the input travel purpose/criterion mode (S50). As for calculation of the importance, the importance of the weather information itself or the importance of the weather information concerning the navigation route may be derived from a table of relationships, or may be calculated by using a predetermined equation. For example, the table and the equation for the calculation may be memorized in the external memory 28. In the present embodiment, the importance is calculated based on the table, and the details of the calculation is described later.

Based on a result of the importance calculation in S50, the weather information is extracted (S60). As for the extraction of the weather information, the weather information having the importance of a predetermined level or greater may be extracted, or top n places of important weather information according to the calculated importance may be extracted. The importance calculation is described later in detail.

Figure 3A:
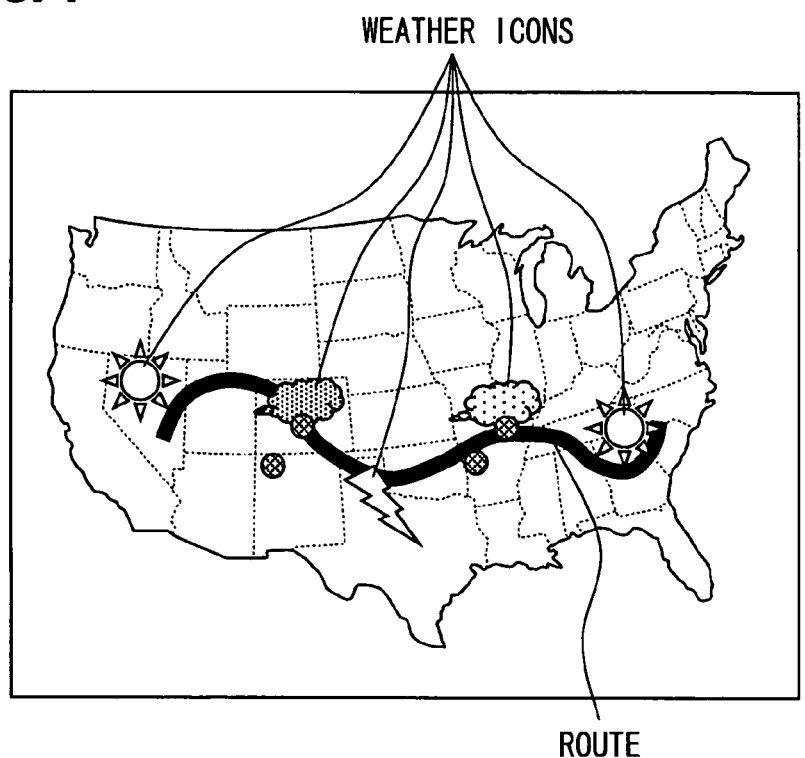
FIGS. 3A and 3B show illustrations of weather information display screens.

When the weather information is extracted in S60, the extracted weather information is displayed on the display unit 26 (S70). The weather information of each area may be, as shown in FIG. 3A, respectively represented by a mark that is positioned along the navigation route for easy recognition by the user in terms of which mark represents the weather of which area. In this manner, the relationship between a point (i.e., an area) on the map and its weather can be intuitively represented.

Figure 3B:
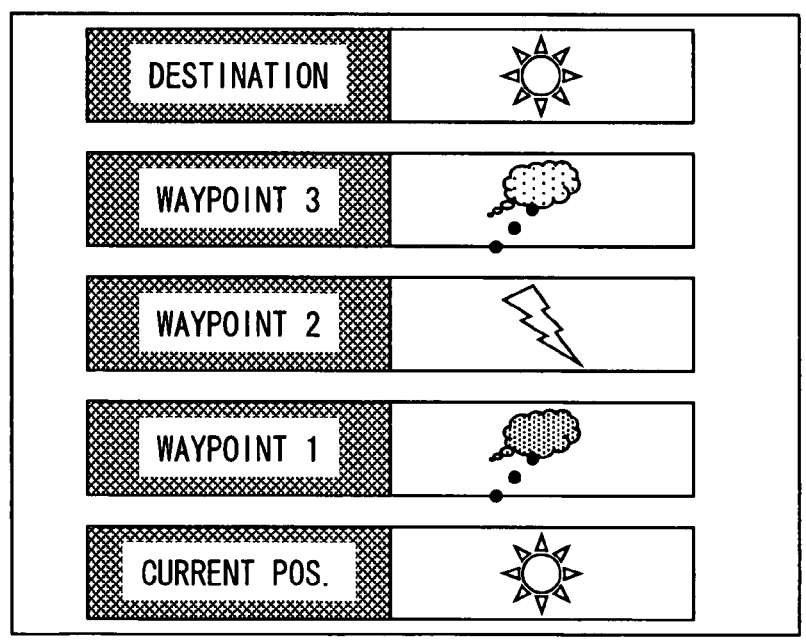

In addition, as shown in FIG. 3B, a list that shows weather marks in association to the areas may be displayed separately on another screen beside the map display screen and/or the route display screen. For example, a two screen view may be made on the display unit 26, and a route is displayed in one screen, with the other screen displaying the weather information in the list form as shown in FIG. 3B.

Figure 5A:
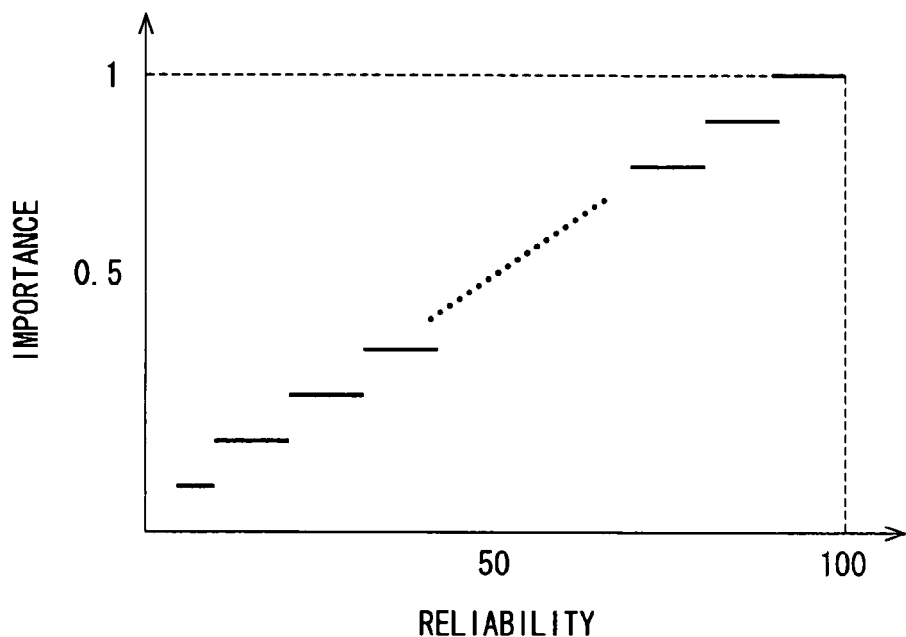
FIGS. 5A and 5B show diagrams of a relationship between a weather information reliability and an importance of the weather information.
Figure 5B:
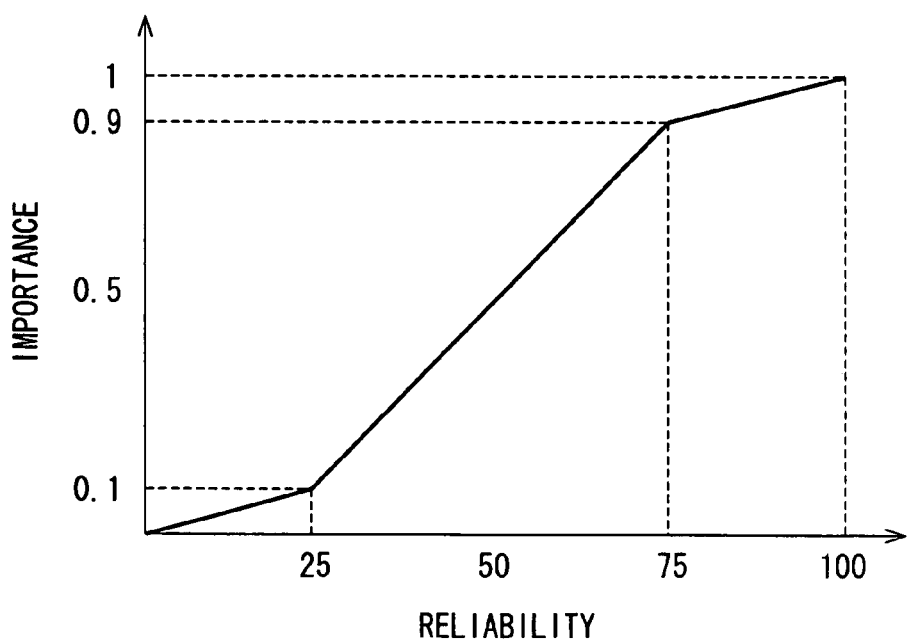

Further, details of importance calculation in S50 as well as details of the weather information extraction in S60 are described with reference to FIGS. 4 to 6. The effect of each process is explained at the same time.

The importance of the weather information may be calculated based on the weather information itself, or the importance may be calculated based on a relationship with the navigation route.

(1) Importance Assignment Based on the Weather Information Itself

The FIG. 4A shows an example of a table which assigns importance to the weather information itself. The importance is set in a range between 0 to 1 in correspondence with the weather information. For example, the weather information has the importance of 0.1 in a case of fine weather, and the importance of cloudy weather is also set to 0.1, the importance of the rain is set to 0.6, the importance of the heavy rain is set to 0.8, the importance of a typhoon is set to 1, and the importance of the snow is set to 0.9, and the like.

This is an idea that the weather information that is highly likely to affect a travel along the navigation route has higher importance. For example, because the possibility of a hindrance of travel caused by the fine/cloudy weather is relatively low, the importance of these weather is set to relatively low, and because the hindrance is highly possible by the weather of heavy rain/typhoon/snow, these weather have relatively higher importance.

The weather information is extracted in S60 of FIG. 2 based on a result of the importance calculation. For example, when the importance of 0.5 or higher is extracted, the fine/cloudy weather with the importance of 0.1 is not extracted, and the rain with the importance of 0.6 and the snow with the importance of 0.9 are extracted.

The reliability of the weather information may be acquired, if it is available, at the same time with the acquisition of the importance of the weather information. As the reliability of the weather information, the precipitation probability itself may be adopted.

As an example of a table that defines a relationship between the importance and the reliability of the weather information, tables shown in FIGS. 4B and 4C can be used.

In the table in FIG. 4B, the reliability between 0 to 5% has the importance of 0 (zero), the reliability between 5 to 10% has the importance of 0.1, with the stepwise importance increase of 0.1 as the reliability increases 10%, up to the importance of 1 when the reliability reaches to the range between 90 to 100%. The relationship between the reliability and the importance is mapped out as a diagram in FIG. 5A.

On the other hand, as shown in FIG. 4C, the reliability of 0% has the importance of 0 (zero), the reliability of 25% has the importance of 0.1, the reliability of 75% has the importance of 0.9, and the reliability of 100% has the importance of 1. That is, the importance of each of the ranges between 0 to 25% reliability, 25 to 75% reliability, and 75 to 100% reliability is respectively calculated by using a linear interpolation of the edge values of each of those ranges. In this case, the relationship between the reliability and the importance is mapped out as a diagram in FIG. 5B.

For example, the importance value of the weather information shown in the FIG. 4A may be multiplied by the importance value in either of FIG. 4B or FIG. 4C for the calculation of final importance.

(2) Importance Assignment in Association with the Navigation Route (2-1) Raising Importance of an n Division Point of the Navigation Route A decision of the user whether to take a certain navigation route is facilitated when an outline of weather change along the entire navigation route is grasped. For example, when the weather information of every city, town and village is available, there may be weather information for each of the areas at every several kilometers depending on the shape and/or size of each area. The weather information may preferably be thinned out for an easier decision when the weather information of all areas along the entire navigation route is too abundant.

Therefore, the importance of the weather information of the area that includes an n division point ("n" is an integer that is equal to or greater than 2) of the navigation route may be raised relative to the weather information of other areas. Further, a lower limit of the section length after dividing the navigation route may be established for avoiding the section of too small length. For example, when the lower limit value is set to 10 km or the like, the extraction of the weather information of every 5 kilometers can be avoided. Furthermore, the value of division number "n" may be determined so as not to divide the navigation route into small sections that have smaller-than-the-lower-limit section length.

In addition, the lower limit of the section length may be changed according to road types. For example, the value of 20 km may be used for an expressway.

Similarly, an estimated travel time may be divided into plural portions, and the weather of the area which includes a point that is reached by a travel after every n th division travel time may have the higher importance.

(2-2) Raising Importance of an Area that has a Longer Navigation Route/a Longer Travel Time Contained Therein FIG. 6A shows an example of a table which defines a relationship between a passage length and the weather importance. In this example, a ratio of the length of the navigation route in an area to the entire navigation route length (i.e., a total length) is associated with the importance value.

More practically, a ratio of a passage length divided by the total length between 0 to $1/100$ has the importance of 0, a ratio of passage length divided by the total length between $1/100$ to $1/75$ has the importance of 0.2, a ratio of passage length divided by the total length between $1/75$ to $1/50$ has the importance of 0.4, a ratio of passage length divided by the total length between $1/50$ to $1/25$ has the importance of 0.6, a ratio of passage length divided by the total length between $1/25$ to $1/10$ has the importance of 0.8, a ratio of passage length divided by the total length between $1/10$ to $1/5$ has the importance of 0.9, a ratio of passage length divided by the total length between $1/5$ to 1 has the importance of 1.

In other words, among the weather information acquired for each area, the weather information that corresponds to the area with longer passage length of the navigation route is configured to have higher importance.

FIG. 6B shows an example of the table which defines a relationship between a travel time and the weather importance. In this example, a ratio of the travel time of the navigation route in an area to the travel time of the entire navigation route (i.e., a total time) is associated with the importance value. Regarding the technique of route setting and/or guidance of the navigation apparatus, various methods have been proposed. Therefore, the travel time in a certain area and the total travel time are easily calculated.

More practically, a ratio of the travel time to the total time between 0 to $1/100$ has the importance of 0, a ratio of the travel time to the total time between $1/100$ to $1/75$ has the importance of 0.2, a ratio of the travel time to the total time between $1/75$ to $1/50$ has the importance of 0.4, a ratio of the travel time to the total time between $1/50$ to $1/25$ has the importance of 0.6, a ratio of the travel time to the total time between $1/25$ to $1/10$ has the importance of 0.8, a ratio of the travel time to the total time between $1/10$ to $1/5$ has the importance of 0.9, and a ratio of the travel time to the total time between $1/5$ to 1 has the importance of 1.

In other words, among the weather information acquired for each area, the weather information that corresponds to the area that requires longer travel time is configured to have higher importance.

In this manner, the longer travel time that makes a travel condition in a certain area susceptible to the weather may preferably be reflected as a higher value of the importance of the weather information of that area.

(2-3) Raising Importance of an Area that has a Higher Speed Limit

FIG. 6C shows an example of the table which defines a relationship between a speed limit and the weather importance. In this example, a speed limit in an area is associated with the importance value. That is, a speed limit of 0 to 20 km/h has the importance of 0 (zero), a speed limit of 20 to 40 km/h has the importance of 0.4, a speed limit of 40 to 60 km/h has the importance of 0.6, a speed limit of 60 to 80 km/h has the importance of 0.8, a speed limit of 80 to 100 km/h has the importance of 1, and a speed limit of more than 100 km/h also has the importance of 1.

The weather information of the area that has higher speed limit of traffic regulation is configured to have the higher importance value. This is because the higher travel speed is estimated to have a greater influence to the travel condition in terms of the travel in, for example, the rain, snow, strong wind or the like.

(2-4) Adjustment According to the Road Condition

There may be cases where the weather information is substantially meaningless depending on the road condition. For example, the travel on a road in a tunnel or an underpass is not affected by the weather of the area. Therefore, the importance of the weather information in such a situation is lowered.

(3) Importance Assignment Based on Other Criteria (3-1) Changing Importance According to Time of Travel FIG. 6D shows an example of a table which assigns importance to the time of the day. That is, the time of the travel between 0:00 a.m. and 5:00 a.m. has the importance of 0.2, the time of the travel between 5:00 a.m. and 6:00 a.m. has the importance of 0.5, the time of the travel between 6:00 a.m. and 7:00 a.m. has the importance of 0.8, the time of the travel between 7:00 a.m. and 8:30 a.m. has the importance of 1, the time of the travel between 8:30 a.m. and 9:00 a.m. has the importance of 0.7, and the time of the travel between 9:00 a.m. and 10:00 a.m. has the importance of 0.2, and the like.

The assignment of the importance described above is based on an assumption that bad weather during the commuting time (morning or evening) of the day may lead to a heavier traffic, thereby having an increased importance for drivers. Because the technology to calculate expected transit time is suggested in various ways in a navigation-related technical field, it is easy to expect the time to pass an appointed spot on the route.

In this case, the weather information at a certain time of the future has to be acquired from the information center 5. Forecasting the weather information for a certain time of the future has been generally realized. Therefore, for example, the weather information of every 3 hours, or of every 1 hour may be stored in the information center 5, and the stored weather information may be transmitted to the navigation apparatus 20 for facilitating the determination of the importance according to the time of the travel.

(3-2) Changing Importance Depending on a Travel Purpose

The importance of the weather information may change depending on a travel purpose. For example, the importance of the travel with the purpose of traveling itself and the importance of the travel with the purpose of viewing scenery may have different importance for the same weather information.

For example, the importance of the weather information has lower values for a night travel due to the lack of invisibility at night when the travel purpose is viewing the scenery during the day, or the importance of the weather information for the night travel and for the day travel should be reversed when viewing the night scene of the city is the purpose of the travel.

(3-3) Assigning Importance by Applying Plural Criteria in an Overlapping Manner

When plural criteria described above are used in an overlapping manner, the criterion mode for a novice driver, or for an average driver may be used as explained in the description of S40. The criterion mode of certain type may be associated with the plural criteria in advance, and the plural criteria specified by the inputted criterion mode may be used in an overlapping manner for calculating the importance of the weather information.

For example, when the criterion mode for a novice driver is used, the importance table based on the weather information in FIG. 4A, the importance table based on the reliability of the weather information in FIG. 4B or 4C, and the importance table based on the passage length in FIG. 6A may be used to calculate the importance of the weather information in each of the travel areas.

The total importance of the weather information in each area may be calculated by an equation in the following.

(Total importance)=passage length×weather×reliability

After calculating the importance, the weather information in top n places may be, for example, extracted.

Correspondence of the terms in the present embodiment to the claim language may conceptually defined in the following manner.

That is, the map data input unit 25 may conceptually be claimed as a route information acquisition unit. The communication unit 24 may conceptually be claimed as a weather information acquisition unit. The display unit 26 may conceptually be claimed as a notification unit. The control unit 29 may conceptually be claimed as a control unit. The operation switch group 22 may conceptually be claimed as a mode reception unit and a travel purpose reception unit.

Although the present invention has been fully described in connection with the preferred embodiment thereof with reference to the accompanying drawings, it is to be noted that various changes and modifications will become apparent to those skilled in the art.

For example, the navigation apparatus 20 installed on a vehicle with a weather information notification function in the above embodiment may be replaced with a mobile navigation apparatus that can be carried by a person as long as it has the weather information notification function. Further, a portable device such as a cellular phone that can be carried by a person may be used as long as it has the weather information notification function. Furthermore, a personal computer or the like, for example, may be used as the apparatus as long as it has the weather information notification function.

The weather information is notified for a user from the display unit 26 by displaying the information in the above embodiment. However, the information may be conveyed for the user though the voice from the speaker 27, or the information from the display unit 26 may be combined with the information from the speaker 27.

Furthermore, a weather point on the navigation route is determined for determining the importance of the weather information of the area around the route in the following manner, and the weather point is rounded in the following manner in the navigation route.

Figure 7A:
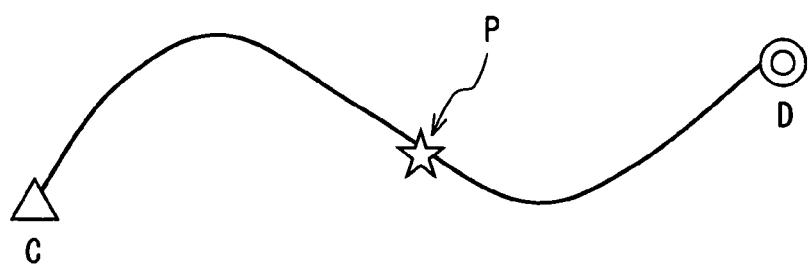
FIGS. 7A and 7B show illustrations of weather point rounding method along a navigation route.
Figure 7B:
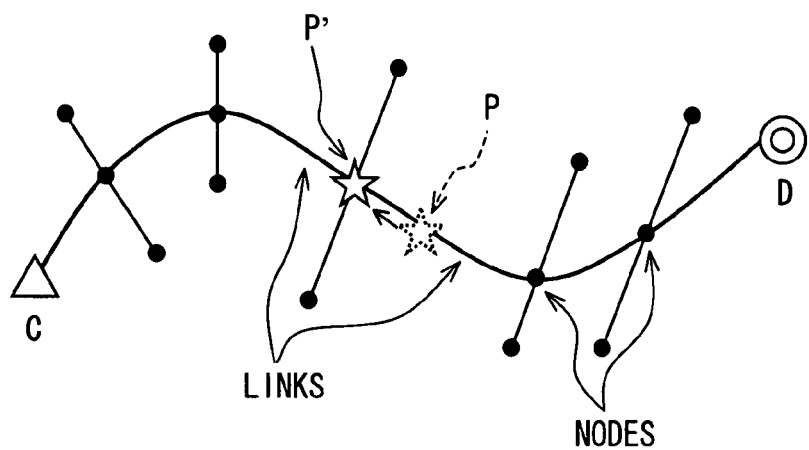

That is, as shown in FIGS. 7A and 7B, the control unit 29 determines a weather point P on the route for notification of the weather information when the route is represented by links and nodes in map data, and the weather point P may be rounded off to an edge node P' of a link that contains the weather point P based on a predetermined condition. In this manner, a notification process of the weather information is facilitated due to the use of the links and nodes data and the compatibility of the links and nodes with other data. (In FIGS. 7A/B, a point C represents a current position, and a point D represents a destination.)

Further, the weather point may be determined as the route division point for dividing the route into plural sections, and the weather point may be rounded off to a closer edge node of the link, when, for example, the weather point on the route is closer to one of the two edge nodes of the link. In this manner, the notification process of the weather information is further facilitated.

Furthermore, the rounding off of the weather point may be performed based on additional criterion such as always rounding off to the edge node on a start point side when, for example, the closeness of the weather point to both of the two edge nodes are identical. The additional criterion may also employ different standards such as the importance of the weather information or the like.

Such changes and modifications are to be understood as being within the scope of the present invention as defined by the appended claims.

What is claimed is:

1. A weather information notification apparatus arranged to be installed in a vehicle, comprising:
    a route information acquisition unit that acquires route information capable of determining a route through which the vehicle travels;
    a weather information acquisition unit that acquires weather information of an area through which the route determined by the route information from the route information acquisition unit passes, wherein, when the route passes through plural areas, the weather information acquisition unit acquires weather information of each of the plural areas through which the route passes;
    a notification unit that notifies a user of various information; and
    a control unit that controls the notification unit for notifying the user of the weather information acquired by the weather information acquisition unit, wherein the control unit determines one of weighted importance of the weather information by itself weighted with respect to other weather conditions, and weighted importance of the weather information weighted with respect to other weather conditions relative to the route based on an evaluation of one of a predetermined relationship and a predetermined equation, the control unit extracts, from the weather information which was acquired and weighted, the weather information that agrees with a predetermined condition from among the weather information of the area through which the route passes as the important weather information, and the control unit notifies the user of the important weather information acquired by the weather information acquisition unit, but does not notify the user of weather information which is not extracted by the control unit, by the notification unit in a manner that enables the user to associate the weather information with a relevant area.

2. The weather information notification apparatus of claim 1, wherein the control unit assigns higher importance to the weather information relative to the importance of other weather information when the weather information has higher probability to influence a travel along the route.

3. The weather information notification apparatus of claim 1, wherein the control unit assigns higher importance to the weather information relative to the importance of other weather information when the weather has higher probability to influence viewing scenery along the route.

4. The weather information notification apparatus of claim 1, wherein the control unit assigns higher importance to the weather information of an area that includes a route division point relative to the importance of other weather information when the route is divided into at least two sections by the route division point.

5. The weather information notification apparatus of claim 1, wherein the route is represented by using a link and a node in map data, the control unit determines a weather point on the route for notification of the weather information in a predetermined manner, and the weather point is rounded off to an edge node of a link that contains the weather point based on a predetermined condition.

6. The weather information notification apparatus of claim 5, wherein the predetermined manner for determining the weather point is dividing the route into plural sections, and the predetermined condition for rounding off the weather point is closeness to one of the edge nodes of the link.

7. The weather information notification apparatus of claim 6, wherein the predetermined condition for rounding off the weather point includes an additional criterion besides the closeness to one of the edge nodes of the link.

8. The weather information notification apparatus of claim 1, wherein the control unit assigns higher importance to the weather information of the area that requires longer travel time to pass through for a travel along the route relative to the importance of other weather information when the route passes through plural areas.

9. The weather information notification apparatus of claim 1, wherein the control unit assigns higher importance to the weather information of the area that has a longer travel distance for a travel along the route relative to the importance of other weather information when the route passes through plural areas.

10. The weather information notification apparatus of claim 1, wherein the route information acquisition unit is configured to acquire a permitted maximum speed of the route, the control unit assigns higher importance to the weather information of the area that has a higher permitted maximum speed for a travel along the route relative to the importance to other weather information when the route passes through plural areas.

11. The weather information notification apparatus of claim 2 further comprising:

a mode reception unit that receives a user input of an assignment criterion mode, wherein the control unit employs an importance assignment criterion in claim 2 in combination with at least one other criterion of a degree of influence of weather on a travel in the area, a degree of influence of the weather on viewing scenery in the area, an inclusion of a route division point that divides the route to equidistant portions in the area, a length of travel time in the area, a length of travel distance in the area, and a permitted maximum speed in the area, and the control unit determines the importance of the weather information by employing plural importance assignment criteria in an overlapping manner in correspondence to the assignment criterion mode received by the mode reception unit based on a relationship between the assignment criterion mode and a selection of the importance assignment criteria.

12. The weather information notification apparatus of claim 1, wherein the weather information acquisition unit acquires a reliability of the weather information, and the control unit assigns the importance to the weather information in consideration of the reliability of the weather information, and the importance of the weather information is determined by employing one of a relationship and an equation between the reliability and the importance that increases the importance of the weather information in proportion to the reliability of the weather information even when the weather information itself is identical.

13. The weather information notification apparatus of claim 1 further comprising:

a current position determination unit in a condition of one of an installation on a movable object and a portability that determines a current position, the control unit is configured to calculate an estimated arrival time for a position in a destination area based on a travel time along the route to the destination position from the current position that is determined by the current position determination unit, the weather information acquisition unit is configured to acquire the weather information at a certain time of the future, and the control unit adopts the weather information at the certain time close to the estimated arrival time respectively as the weather information of the destination area when the route passes through plural areas.

14. The weather information notification apparatus of claim 1 further comprising:
a travel purpose reception unit that receives a travel purpose of the travel along the route from the user,
wherein the control unit assigns the importance of the weather information based on a result derived from one of a predetermined relationship and a predetermined equation in correspondence to the travel purpose received by the travel purpose reception unit.

15. The weather information notification apparatus of claim 1,
wherein the notification unit is a display unit that notifies information by displaying the information, and
the control unit displays the route on a map with the weather information in a manner that recognizably indicates correspondence of the weather information to respective areas along the route.

16. A program product having instructions stored in a computer-readable storage medium for controlling a computer, the instructions comprising:
controlling the computer as the control unit of the weather information notification apparatus of claim 1.

* * * * *